United States Patent [19]

Quek et al.

[11] Patent Number: 5,245,564
[45] Date of Patent: Sep. 14, 1993

[54] APPARATUS FOR MULTIPLYING OPERANDS

[75] Inventors: S. M. Quek, San Jose; Larry Hu, Mountain View; Jnyaneshwar P. Prabhu, San Jose; Frederick A. Ware, Los Altos Hills, all of Calif.

[73] Assignee: Weitek Corporation, Sunnyvale, Calif.

[21] Appl. No.: 698,758

[22] Filed: May 10, 1991

[51] Int. Cl.$^5$ .......................... G06F 7/52; G06F 7/38; G06F 15/32
[52] U.S. Cl. ................................ 364/754; 364/760; 364/745; 364/735
[58] Field of Search ............... 364/754, 757, 760, 749, 364/751, 752, 753, 761, 765, 745

[56] References Cited

U.S. PATENT DOCUMENTS

| | | | |
|---|---|---|---|
| 4,567,568 | 1/1986 | Inagawa et al. | 364/765 |
| 4,809,212 | 2/1989 | New et al. | 364/754 |
| 4,817,029 | 3/1989 | Finegold | 364/760 |
| 4,825,401 | 4/1989 | Ikumi | 364/757 |
| 4,866,652 | 9/1989 | Chu et al. | 364/748 |
| 4,876,660 | 10/1989 | Owen et al. | 364/754 |
| 4,910,701 | 3/1990 | Gibbons et al. | 364/760 |
| 5,047,973 | 9/1991 | Steiss et al. | 364/752 |
| 5,065,352 | 11/1991 | Nakano | 364/765 |

OTHER PUBLICATIONS

D. Steiss et al., "A 65MHz Floating-Point Coprocessor . . . ", IEEE, 1991, pp. 94 and 95.
"IEEE Standard for Binary Floating-Point Arithmetic", IEEE, 1985, pp. 7-18.
Article entitled "Performing Floating Point Division . . . ", Weitek Corporation.
S. Waser et al., "Introduction to Arithmetic for Digital . . . ", CBS College Publishing, New York, 1982, pp. 196-199.
Hennessy & Patterson, "Computer Architecture", Morgan Kaufmann Publishers Inc., 1990, pp. A-23 to A-26 & A-63 to A-66.

*Primary Examiner*—Long T. Nguyen
*Attorney, Agent, or Firm*—Townsend and Townsend Khourie and Crew

[57] ABSTRACT

In an apparatus and method for computing inverses and square roots a highly accurate initial approximation is computed using a second order polynomial equation, the coefficients of which are stored in a ROM. The most significant bits of an operand are used to address a ROM to select coefficients, providing different coefficients for different operand ranges. The remaining lesser significant operand bits are used in the computation; the coefficient values already account for the bits used to address them. The result is in single precision accuracy. For double precision, the polynomial results are used as the first approximation for a Newton-Raphson iteration. The multiplier has a split array mode to speed up the calculation of the polynomial, whereby two lesser precision values can be computed at once. The size of the coefficients is tailored to produce the proper precision result for each of the elements of $Ax^2+Bx+C$. Separate values for the coefficients A, B, and C must be stored for the $1/x$ approximation and for the $1/\sqrt{x}$ approximation. Also to speed up the multiplier, the multiplier can accept one operand in carry/save format, by providing Booth recoder logic which can accept operands in a normal binary or in a carry/save format. Also employed is a rounding technique which provides IEEE exact rounding by an operation that includes only one multiplication.

3 Claims, 13 Drawing Sheets

FIG. 1.

| SINGLE PRECISION DIVIDE (OR SQUARE ROOT) | | | |
|---|---|---|---|
| 1ST PIPE | | | 2ND PIPE |
| MULTIPLIER ARRAY | | | CP ADDER |
| CYCLE | $A_{OP}$ | $B_{OP}$ | |
| 1 | X | X; LOOKUP A, B, C | DON'T CARE |
| 2 | A<br>X | $X^2$ } 2 HALF ARRAYS<br>B } ADD IN C | ROUND $X^2$ |
| 3 | Y | $Ax^2 + Bx + C$ | ROUND $Ax^2 + Bx + C$ |
| 4 | DON'T CARE | | ROUND Q & CORRECT |
| 5 | X | · Q, ADD IN -Y | CORRECTION (PART 2) |
| 6 | DON'T CARE | | ROUND XQ-Y |

DOUBLE PRECISION DIVIDE Y/X

| | 1ST PIPE MULTIPLIER ARRAY | | 2ND PIPE CPADDER |
|---|---|---|---|
| CYCLE | AOP | BOP | |
| 1 | X | X | DON'T CARE |
| 2 | A | $X^2$ } 2 HALF ARRAYS | ROUND $X^2$ (DON'T USE) |
| | X | B } ADD IN C | |
| 3 | −X | $Ax^2+Bx+C=f_0$ ADD 2 | RESULT= $2-xf_0$ |
| 4 | $f_0$ | $2-X\,f_0$ | ROUND $2-xf_0$ |
| 5 | Y | $f_0(2-xf_0)$ | ROUND $f_0(2-xf_0)=f_1$ |
| 6 | DON'T CARE | | ROUND Q & CORRECT |
| 7 | X | Q; ADD IN −Y | CORRECTION (PART 2) |
| 8 | DON'T CARE | | ROUND xQ−Y |

*FIG. 8A.*  PRIOR ART $A = A_{N-1}\ A_{N-2}\ A_{N-3}\ \cdots\ A_2\ A_1\ A_0$ $B = B_{M-1}\ B_{M-2}\ B_{M-3}\ \cdots\ B_2\ B_1\ B_0$

FIG. 7.  PRIOR ART

| BIT | | | OPERATION | |
|---|---|---|---|---|
| $2^1$ | $2^0$ | $2^{-1}$ | | |
| $Y_{i+1}$ | $Y_i$ | $Y_{i-1}$ | | |
| 0 | 0 | 0 | ADD ZERO (NO STRING) | +0 |
| 0 | 0 | 1 | ADD MULTIPLICAND (END OF STRING) | +X |
| 0 | 1 | 0 | ADD MULTIPLICAND (A STRING) | +X |
| 0 | 1 | 1 | ADD TWICE THE MULTIPLICAND (END OF STRING) | +2X |
| 1 | 0 | 0 | SUBTRACT TWICE THE MULTIPLICAND (BEGINNING OF STRING) | -2X |
| 1 | 0 | 1 | SUBTRACT THE MULTIPLICAND (-2X AND +X) | -X |
| 1 | 1 | 0 | SUBTRACT THE MULTIPLICAND (BEGINNING OF STRING) | -X |
| 1 | 1 | 1 | SUBTRACT ZERO (CENTER OF STRING) | -0 |

APPARATUS FOR MULTIPLYING OPERANDS

BACKGROUND

The present invention relates to math processors for doing floating point divide and square root operations.

Typically, divide and square root operations are calculated in math coprocessors with a tedious method of subtracting and shifting, as with long division by hand. The disadvantage of this method is that it takes a long time to complete all of the necessary subtract and shift operations.

One method used to improve the speed of division and square root operations takes advantage of quadratic convergence. If one is trying to determine $y/x$, first, a determination of $1/x$ is made, but by methods other than the tedious long division. Then, a multiplication operation can be used ($y$ multiplied by $1/x$), which speeds up the calculation. One way of determining the value of $1/x$ would be to store all the possible values in a memory. However, for the number of bits of accuracy required, this would have to be a huge memory. Accordingly, the value of $1/x$ is calculated each time for different values of $x$. One method is to begin with a low accuracy initial approximation and improve it using a Newton-Raphson iteration. Such a method is described in S. Waser and M. J. Flynn, "Introduction to Arithmetic for Digital Systems Designers", CBS College Publishing, New York, 1982. The iteration uses the equation $F_{K+1} = F_K(2 - x\ F_K)$, where $F_K$ is an approximation to $1/x$. By using an initial approximation of $F_K$ and doing a number of iterations, its accuracy can be improved to the point necessary through quadratic convergence. The $x$ operand is typically normalized to within the range $1 \leq x < 2$, and an initial approximation of $1/x$ can be chosen from values stored in a ROM. A technique similar to the one described above for $1/x$ is also used to compute square roots. This technique first computes $1/\sqrt{x}$ and then multiplies it by $x$ to produce $\sqrt{x}$. If desired, the initial approximation to $1/\sqrt{x}$ can be improved through a Newton-Raphson iteration similar to that above.

SUMMARY OF THE INVENTION

The present invention provides an improved apparatus and method for determining the value of $1/x$ and of $1/\sqrt{x}$ for a given operand $x$, and for determining the value of $y/x$ and $\sqrt{x}$. This is accomplished using a polynomial equation. The coefficients of the polynomial equation are stored in a ROM. Different coefficients are used for different values of $x$. The most significant bits of the $x$ operand are used as inputs to the ROM to select the proper coefficients.

In the preferred embodiment, the polynomial approximation is second order, and the coefficients have enough precision to give a final result for single precision accuracy. For double precision, the results of the polynomial are then used as the first approximation for the Newton-Raphson iteration. This provides a much higher degree of accuracy for the first approximation without the need for increasing the size of the ROM for the initial Newton-Raphson approximation. Accordingly, only one iteration of Newton-Raphson is typically required to produce the result with double precision accuracy.

The polynomial equation used is preferably in the form $Ax^2 + Bx + C$. The present invention also uses a split multiplier array to speed up the calculation of this polynomial. After first calculating $x^2$, the multiplication of A by $x^2$ and B by $x$ are done simultaneously in two halves of the multiplier array. This is possible because the coefficients stored are not needed to have full accuracy. Thus, they require only a portion of the multiplier array to multiply. The size of the coefficients correspond to what is needed to produce the proper precision result for each of the elements of $Ax^2 + Bx + C$. In the preferred embodiment, A is 15 bits, B is 24 bits and C is 32 bits. Separate values for the coefficients A, B, and C must be stored for the $1/x$ approximation and for the $1/\sqrt{x}$ approximation.

In a further aspect of the present invention, a special multiplier is provided which can accept an operand in carry/save format. This eliminates the need to convert partial products into a normal binary format by completely propagating the carry. Thus, the speed of a sequence of multiplications can be improved. This is achieved by providing Booth recoder logic which can accept operands in a normal binary or a carry/save format.

The present invention also provides an improved rounding technique which provides IEEE exact rounding by an operation that includes only one multiplication.

The invention thus speeds up the processor operation in several ways. First, the initial approximation is made very accurate by using the polynomial approximation. Second, the split multiplier array lets more than one operation be performed at once. Third, the Booth recoder logic is designed to accept intermediate operands in carry save format so they don't need to be put into pure binary format before the next multiply can be done. Lastly, the special rounding technique of this invention has very few computational steps.

The technique of this invention is used for divide, square root, inverse, and inverse square root operations, except the special rounding technique, which is not used for the inverse and inverse square root operations.

DETAILED DESCRIPTION OF THE PREFERRED EMBODIMENT

Figure 1:
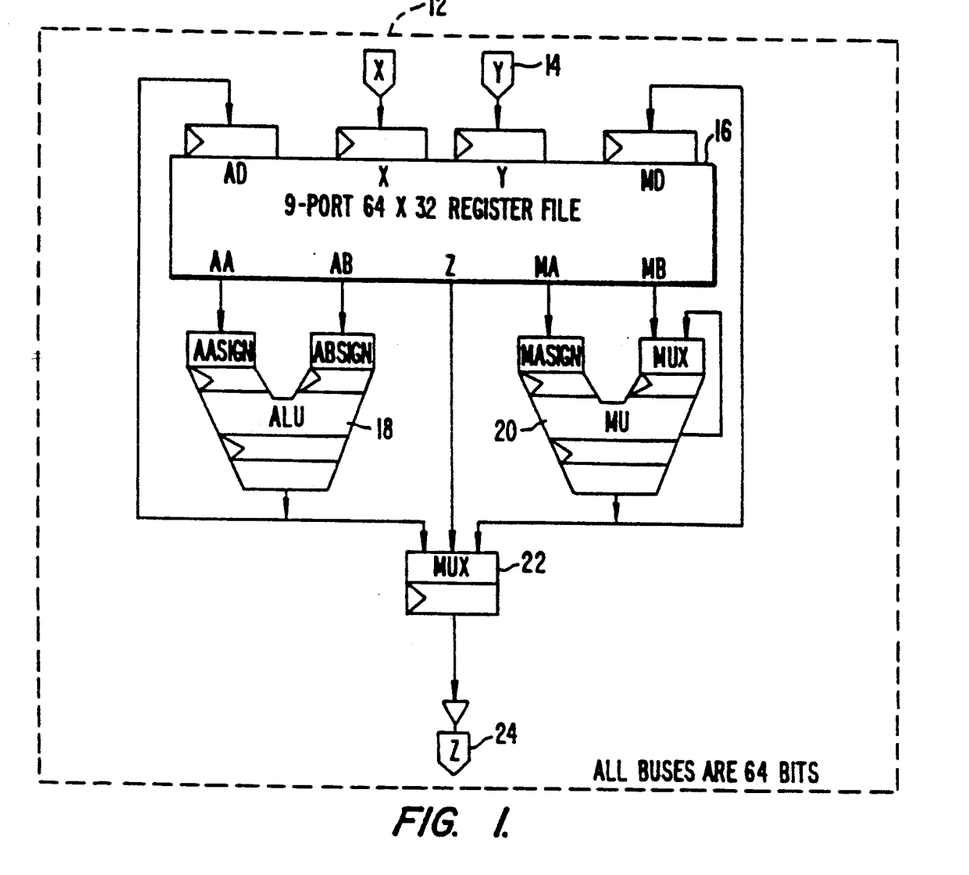
FIG. 1 is a block diagram of the overall chip electronics incorporating the present invention.

FIG. 1 is an overall block diagram of a semiconductor chip incorporating the present invention. A pair of operands are provided on input buses 12 and 14. These are provided to a register file 16. The register file is in turn connected to a separate ALU 18 and multiply unit 20. The outputs of these are provided through multiplexing circuitry 22 to an output 24. This structure allows the ALU and multiply unit to be used in parallel. The invention to which the present application is directed is contained within multiply unit 20.

Polynomial Approximation

Figure 2:
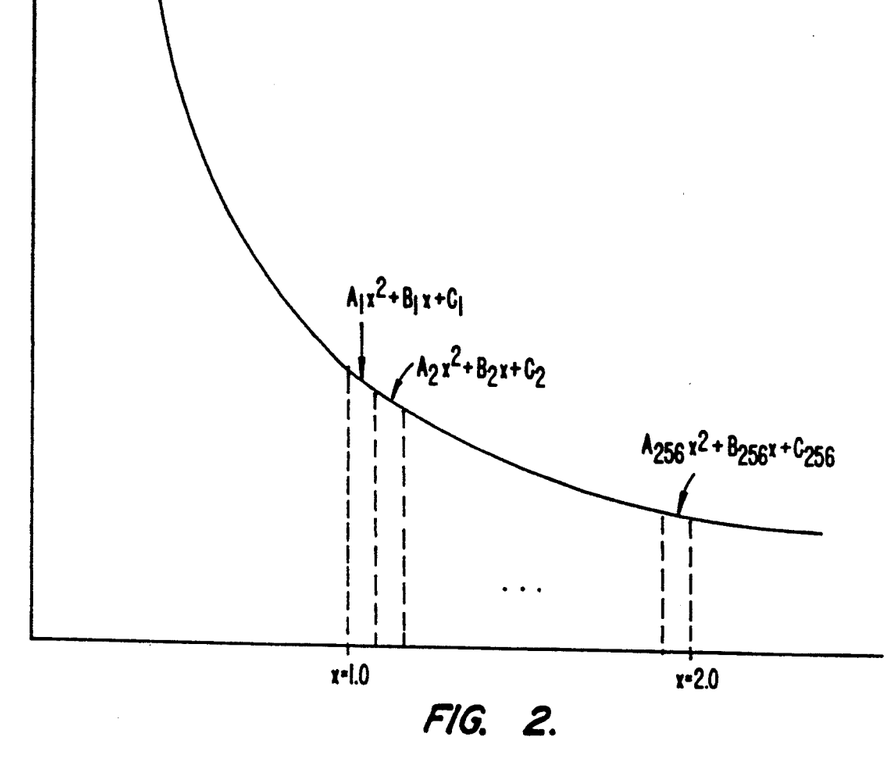
FIG. 2 is a graph illustrating the choosing of coefficients for the polynomial $Ax^2 + Bx + C$.

FIG. 2 is a graph showing the curve for $1/x$ between $x = 1.0$ and $2.0$. As discussed in the background, for doing division operations with a given operand x, it is advantageous to calculate $1/x$ first, and then multiply by the numerator operand y. The determination of $1/x$ is started by an approximation for a given value of x between 1.0 and 2.0. All of the operations (inverse, division, inverse square root, and square root), except as noted, take as initial operands numbers according to IEEE standard 754, which are always normalized to be between 1.0 and 2.0.

In the present invention, the interval between 1.0 and 2.0 is divided into 256 smaller intervals, and the curve for $1/x$ in each interval i in FIG. 2 can be approximated by $A_i x^2 + B_i x + C_i$. Coefficients for each of these 256 intervals for $A_i$, $B_i$ and $C_i$ are separately predetermined.

For each interval, the coefficients for the polynomial $Ax^2 + Bx + C$ are determined by choosing the mid-point of the interval and two other points which are $\sqrt{3}/2$ times one-half the interval size in each direction from the mid-point. These three points are then used to produce three equations, which are solved simultaneously to produce $A_i$, $B_i$ and $C_i$.

Figure 3A:
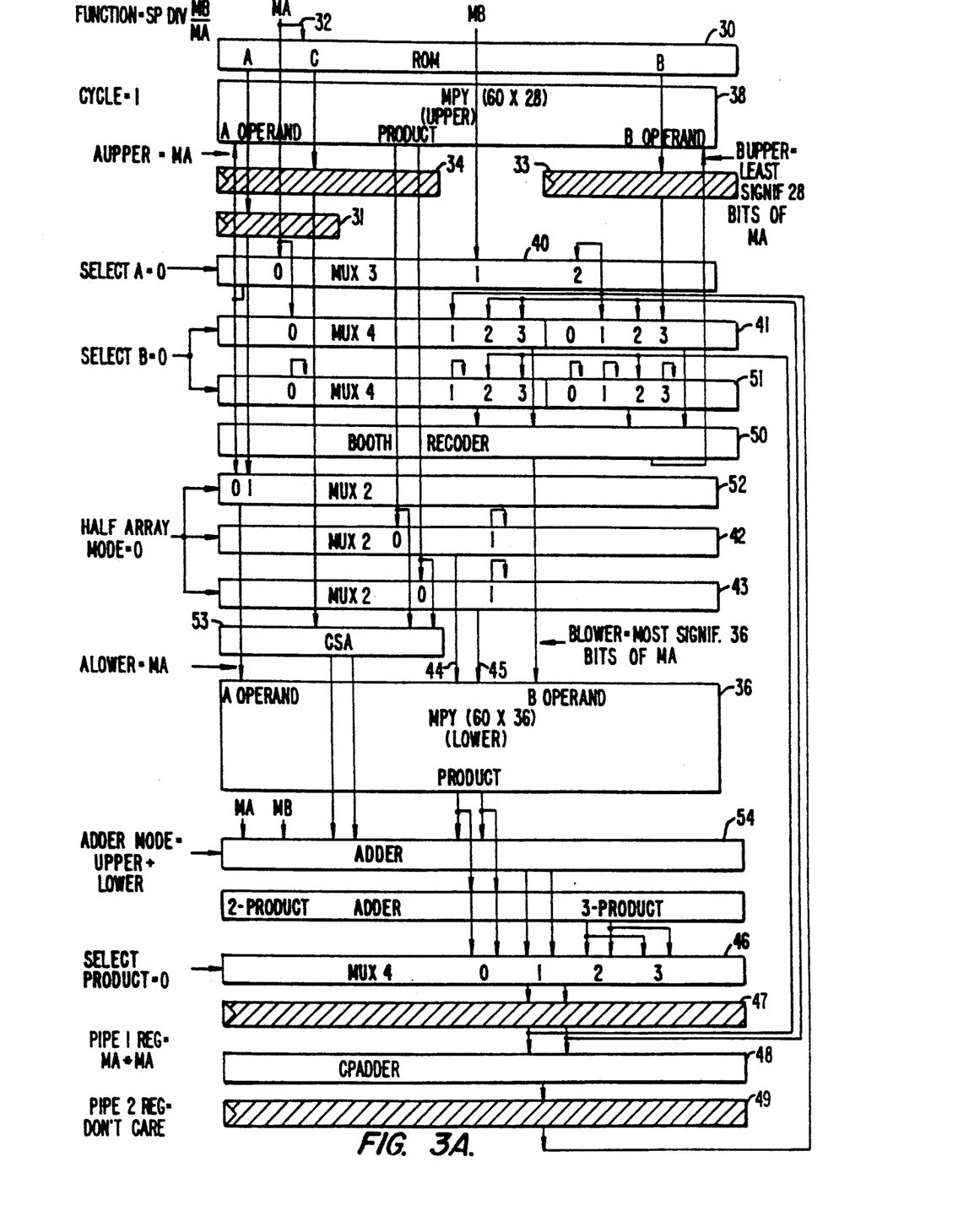
FIGS. 3A, 3B, 3C, 3D, 3E are block diagrams illustrating the logic used for the polynomial calculation according to the present invention.

The values of the coefficients for $A_1$ through $A_{256}$, $B_1$ through $B_{256}$ and $C_1$ through $C_{256}$ are to be stored in a ROM 30 as shown in FIG. 3A, and as explained further below. ROM 30 is addressed by the most significant 8 bits of the x operand on lines 32. One particular embodiment takes advantage of the fact that for each interval, the most significant 8 bits of x are constant. It does this by defining $x = x_0 + \Delta x$, where $x_0$ is the most significant 8 bits of x (which are constant over each interval) and where $\Delta x$ is 8 zeros followed by the remaining bits of x. When this is expanded in the equation $Ax^2 + Bx + C$, and the terms regrouped, the resulting equation is $(A)\Delta x^2 + (2Ax_0 + B)\Delta x + (Ax_0^2 + Bx_0 + C)$. The values in parentheses are constant over each interval, and can be stored in the ROM as modified A, B and C. When the initial approximation is done, the computation will be $A\Delta x^2 + B\Delta x + C$, where A, B and C are these modified values. The advantage of this has to do with significant digits. $\Delta x$ has 8 leading zeros, and $\Delta x^2$ has 16 leading zeros, which get transferred to and lead products made from them. So, the most significant bit of A can effect only the 17th and lesser significant bits of the approximation, and the most significant bit of B can effect only the 9th and lesser significant bits of the approximation. Because this initial approximation needs to be accurate to 28 bits at most, the coefficients do not all need to be stored to full precision. In the preferred embodiment there are 15 bits of accuracy for A, 24 for B, and 32 for C. This provides 31 bits overall accuracy for $Ax^2 + Bx + C$, because there are at least 31 bits of accuracy in each of the three elements being added. The coefficients A, B and C corresponding to this value x are then provided to registers 31, 33 and 34, respectively.

FIG. 3A shows a multiplier which is split into two halves 36 and 38. For the polynomial calculation, the halves are connected to act as a single multiplier for the $x^2$ term, and are used as two separate multipliers to the $Ax^2$ and $Bx$ multiplication simultaneously as discussed below.

Figure 4:
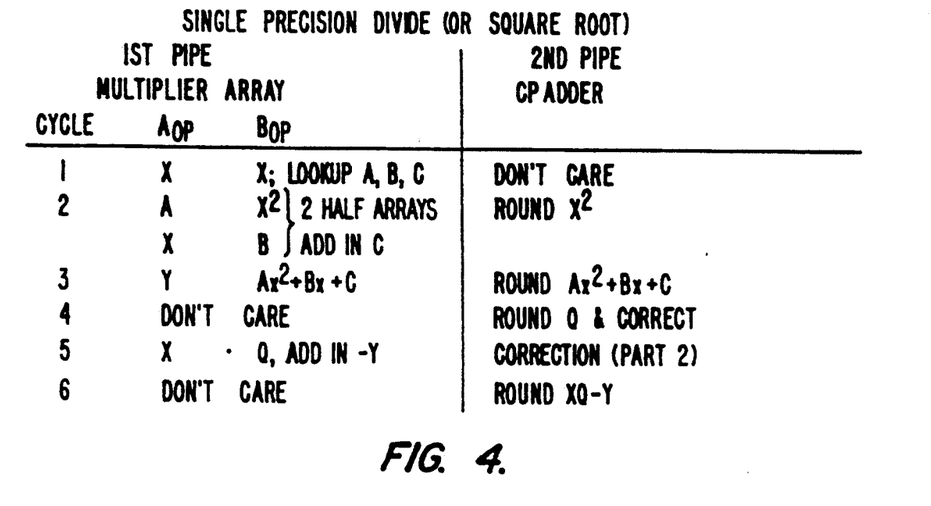
FIG. 4 is a timing chart illustrating the operations performed during different cycles for the polynomial calculation for single precision numbers.

Referring to FIG. 4, the lookup of modified A, B and C is done during cycle 1. At the same time, the multiplication of $\Delta x$ by itself to produce the square term is done with the two array halves acting as one. The upper order bits of operand $\Delta x$ are provided through operand multiplexer 40 and multiplexer 52 to the "A" input of carry/save adder (CSA) multiplier array half 36, while the remaining lower order bits are provided to array half 38. The $\Delta x$ operand is also provided through multiplexer 41 to Booth recoder 50. Booth recoder 50 then supplies the Booth recoded version of the upper order bits of $\Delta x$ to the "B" operand input of multiplier array 36, and the lower order bits to the "B" input of array 38. The product of the lower order multiplication in sum and carry form (CS) is provided to multiplexers 42 and 43, respectively. As can be seen, the control signal for this cycle selects these inputs, labeled "0". These are then shifted over, just as they would be in the multiplier array, and are applied to inputs 44, 45 of array half 36. Array 36 completes the calculation. The $\Delta x^2$ result is provided from the product output of array half 36 through multiplexer 46 to registers 47 for the "first" pipeline (the "second pipeline consists of carry - propagate (CP) adder 48 and second pipeline register 49. The $\Delta x^2$ operand at this stage is stored in carry-save format.

Figure 3B:
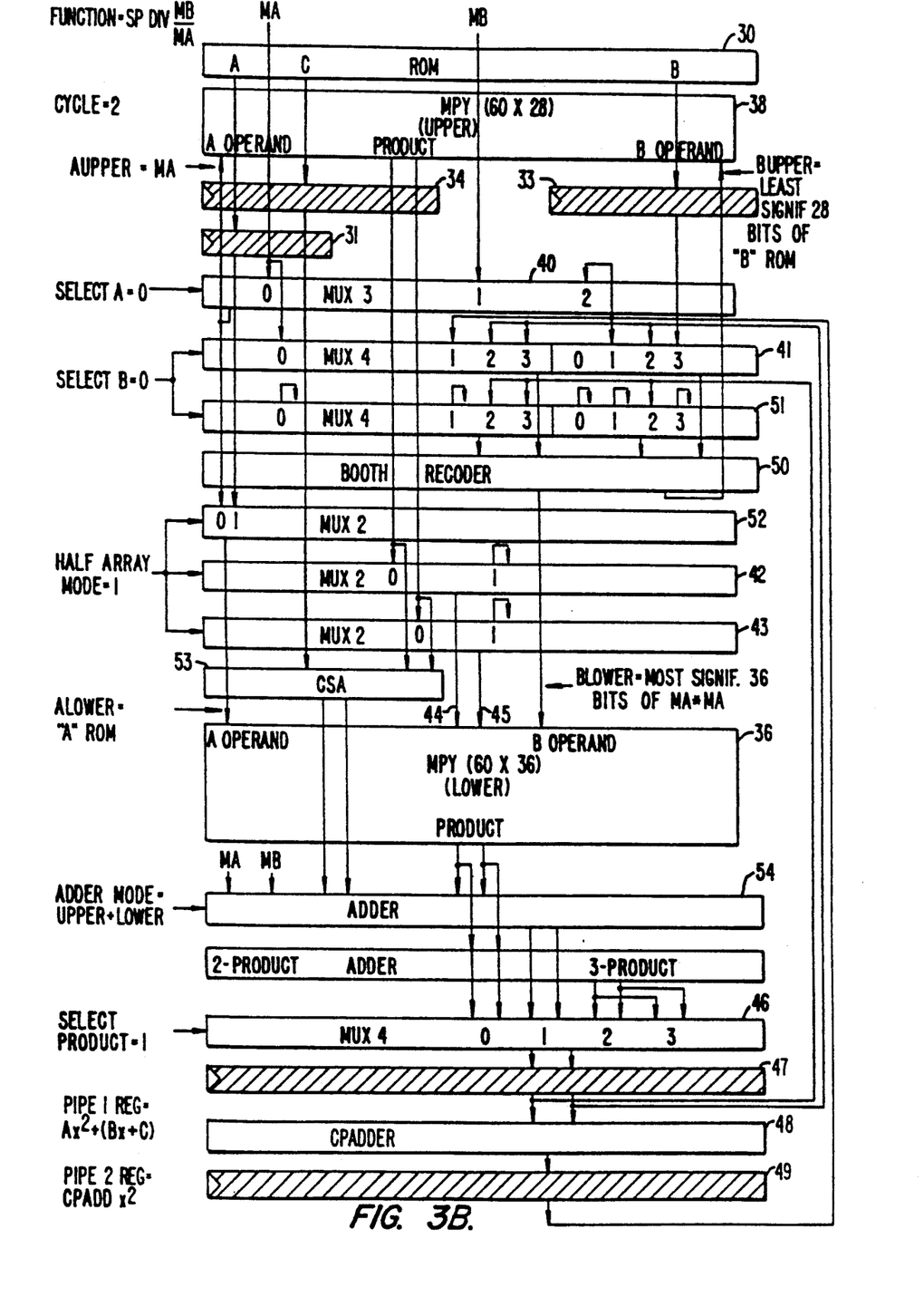

In the second cycle shown in FIG. 4, and illustrated in FIG. 3B with the control signals for cycle 2, the $\Delta x^2$ term from register 47 and the operand A are provided to multiplier array 36 to calculate the $A\Delta x^2$ term. At the same time, the B operand and the $\Delta x$ operand are provided to multiplier array 38, so that the $B\Delta x$ multiplication can be done at the same time. It is possible to do this at the same time using two parts of a split multiplier array since a full 64 bits of the coefficients is not necessary. At the same that this is occurring in cycle 2, in the second pipeline consisting of carry propagate (CP) adder 48 and register 49, a CP rounding operation is done on $\Delta x^2$ to put it into pure binary format. This purely automatic CP rounding is not needed until the final result, however, and the binary form for $\Delta x^2$ and other intermediate results are ignored.

The $\Delta x^2$ term from register 47 is provided in CS format to multiplexers 41 and 51, which connects to the CS inputs of Booth recoder 50, discussed in detail below. Two multiplexers are used because of the S,C format. The Booth coded output is then provided to the "B" operand input of array 36. This output is the most significant 36 bits of $A x^2$, with the rest of the Booth recoder providing bits to array 38. The A coefficient is provided through multiplexer 52 to the "A" operand input of array 36.

The B coefficient is provided from register 33 through multiplexer 41, through Booth recoder 50 to the "B" operand input of array 38. The $\Delta x$ term from the MA input 32 is applied through multiplexer 40 to the "A" operand input of array 38.

Also during cycle 2, the $B\Delta x$ product of array 38 is combined with the C coefficient from register 34 in carry save adder (CSA) 53 to provide the $B\Delta x + C$ term. This output is provided to CSA 54, where it is added to the $A\Delta x^2$ product of array 36, with the result being stored in register 47.

As can be seen, the $x^2$ term is used in carry/save format, without being converted into a normal format through CP adder 48, since this would require additional time. This ability is provided by special Booth recoding logic (which supplies all the necessary information for one of the operands to the multiplier arrays 36 and 38) which accepts either a normal binary format or a CS format as will be described in detail below.

Figure 3C:
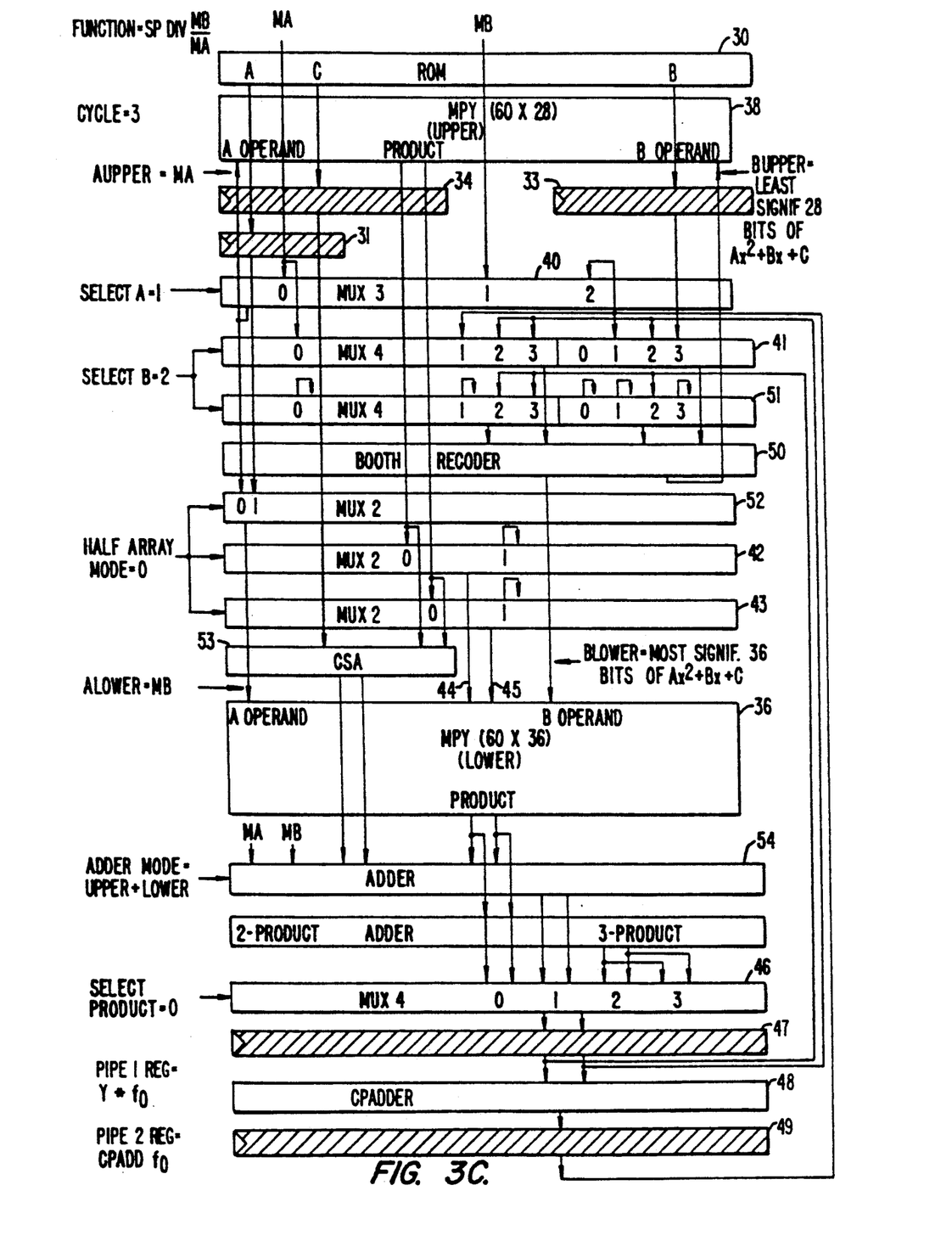
Figure 3D:
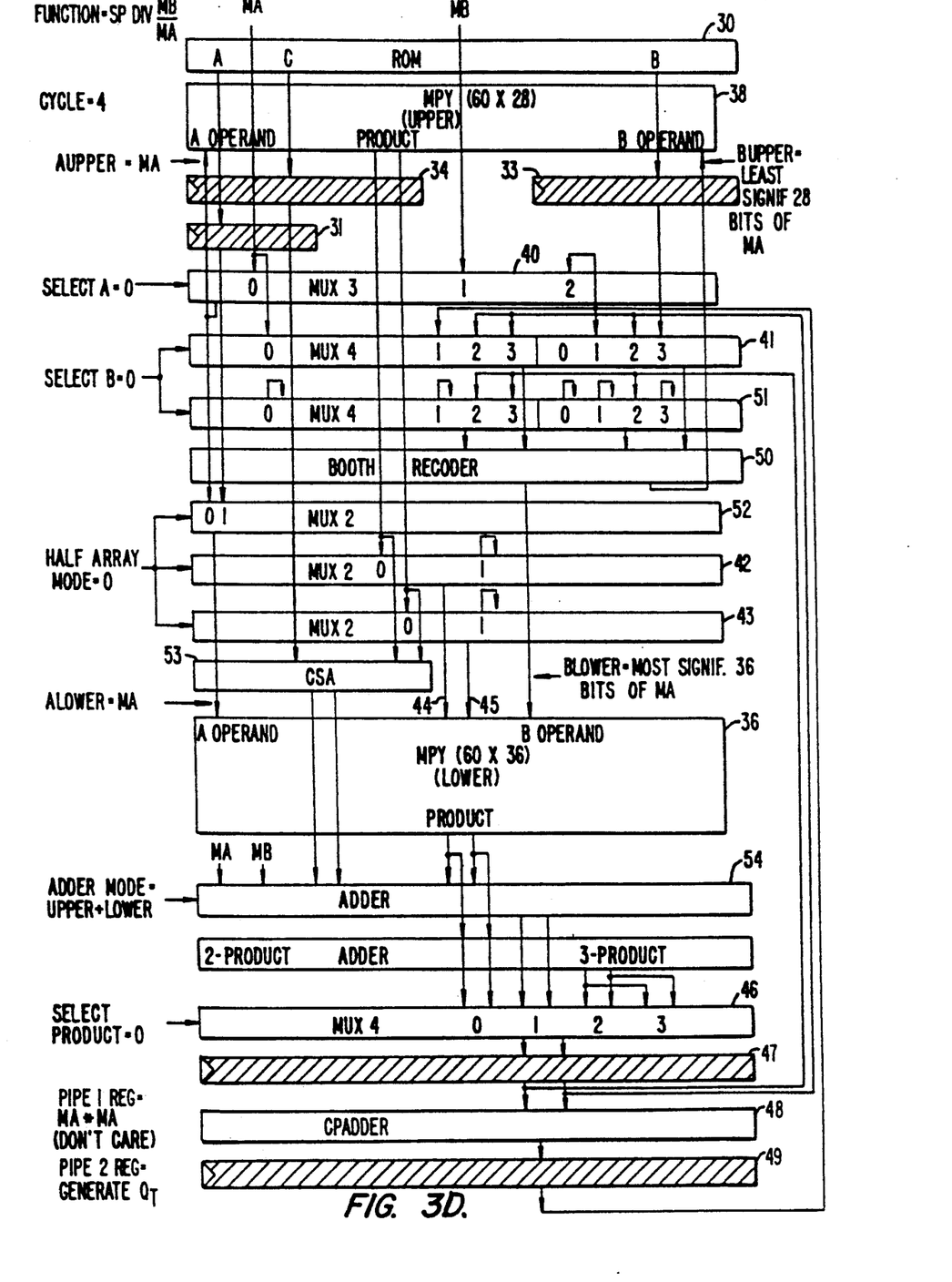
Figure 3E:
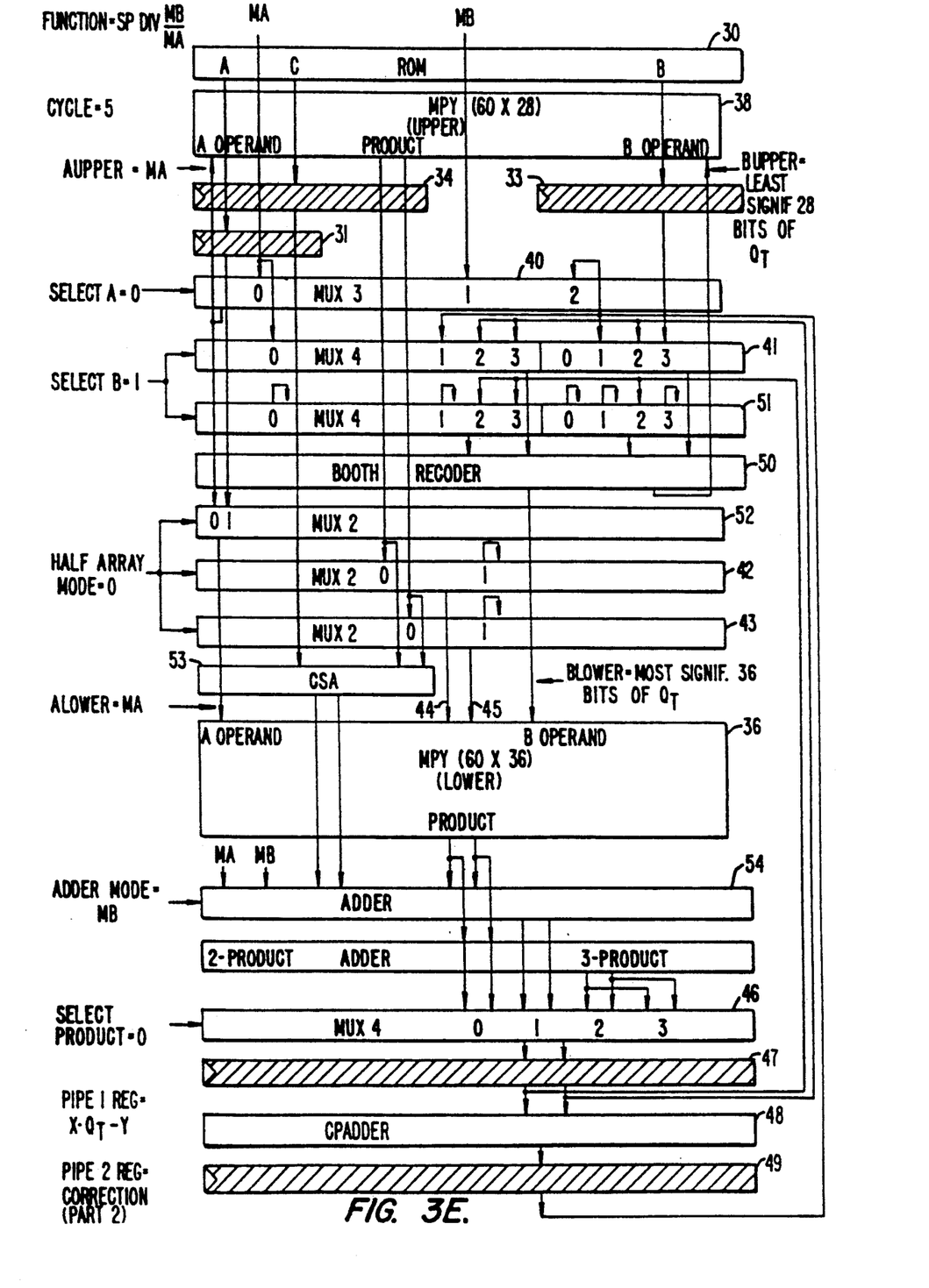

In the third cycle of a single precision calculation, shown in FIGS. 3C and 4, the operand y is multiplied times the polynomial $Ax^2 + Bx + C$. This is done with the polynomial still in CS format, again saving translation time. For a single precision operation, no Newton-Raphson iteration is required because the polynomial provides the necessary level of precision to go straight to the multiplication of the 1/x term by the y term. The control signals used for the remaining cycles are shown in FIGS. 3D and 3E.

Figure 5:
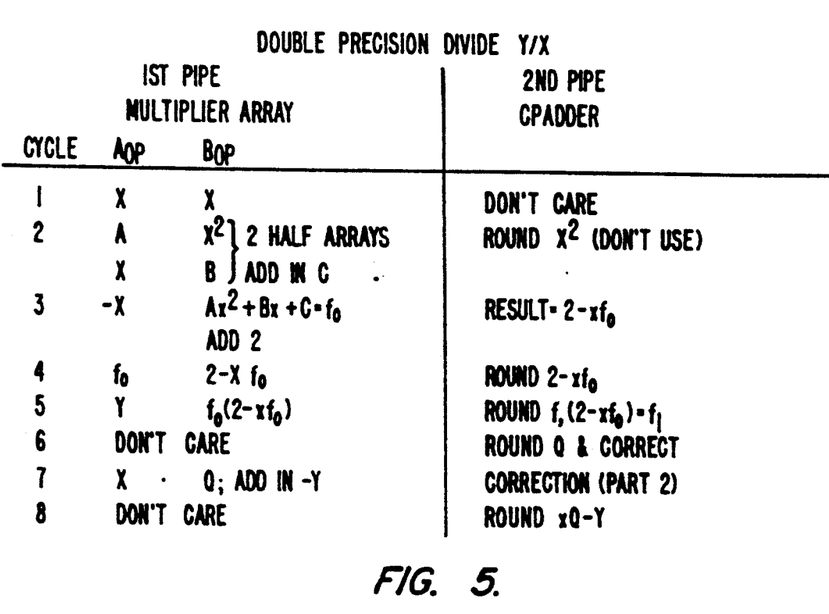
FIG. 5 is a timing chart illustrating the polynomial calculation for double precision numbers

For double precision divide operations, as illustrated in the timing chart of FIG. 5, the operation proceeds similarly up to the third cycle. In the third cycle, a Newton-Raphson iteration is begun by multiplying a negative x value by the polynomial expression $Ax^2 + Bx + C$ (in CS form). The iteration is completed in cycle 4 to provide the precision necessary. Then, in cycle 5, the operand y is multiplied by the Newton-Raphson approximation of 1/x. Here, for double precision, only one iteration of Newton-Raphson is required due to the use of the polynomial equation of the present invention.

The Booth recoding referenced above is discussed in A. D. Booth, "Assigned Binary Multiplication Technique", Quarterly Journal Mechanics and Applied Mathematics, Vol. 4, Part 2, 1951. The logic of the present invention allows the Booth recoding logic to receive the operands in the carry/save format. Thus, for the $x^2$ and other terms, it does not need to be put in a normal format, speeding up the operation, as explained further below.

The determination of a square root is done by also using a polynomial $Ax^2 + Bx + C$, but to approximate the curve $1/\sqrt{x}$ between $X = 0.5$ and 2.0. 512 intervals are used, with a separate ROM, or a separate area of the same ROM 30, storing the coefficients for this inverse-square root approximation. The actual square root is determined from its inverse by multiplying the inverse by X, similar to the division procedure above.

Split Array Multiplier

The manner in which the $Ax^2$ and the Bx term are shown to be computed above takes advantage of another aspect of the present invention. These terms are used in computing the single precision value for 1/x. This single precision result is computed to have an accuracy of only 28 bits; therefore, the values used in computing it need have no more than 28 bits of accuracy. Computing the $Ax^2$ term and the Bx term each require one multiply operation, but again, because a result with only 28 bits of accuracy is needed, operands with only 28 bits of accuracy may be used. Thus, the computation of neither of these two terms requires the full $60 \times 64$ array, and it may be split so that the terms may be computed simultaneously. The particular embodiment shown in FIG. 3 illustrates this, with the multiplier array divided into two sub-arrays 36 and 38, which each have a 60 bit MA operand and which have a 36 bit and 28 bit MB operand, respectively. During the second step of the second order polynomial approximation, the product $Ax^2$ is computed in the $60 \times 36$ sub-array at the same time that Bx is being computed in the $60 \times 28$ sub-array, saving one whole cycle over doing each calculation using the full array.

In general, multistep calculations often involve two intermediate calculations each of which has operands that are not dependent on the results of the other calculation. If so, the intermediate calculations should be examined to see how many bits of accuracy their results and operands need. If the sum of the number of bits needed for an operand of one intermediate calculation plus the number of bits needed for an operand of the other intermediate calculation does not exceed the maximum number of bits available in the array, the array may be split and both intermediate calculations performed at the same time. The same analysis indicates that for a more complex calculation the array could be split to allow three or more calculations to be performed at once.

Figure 6A:
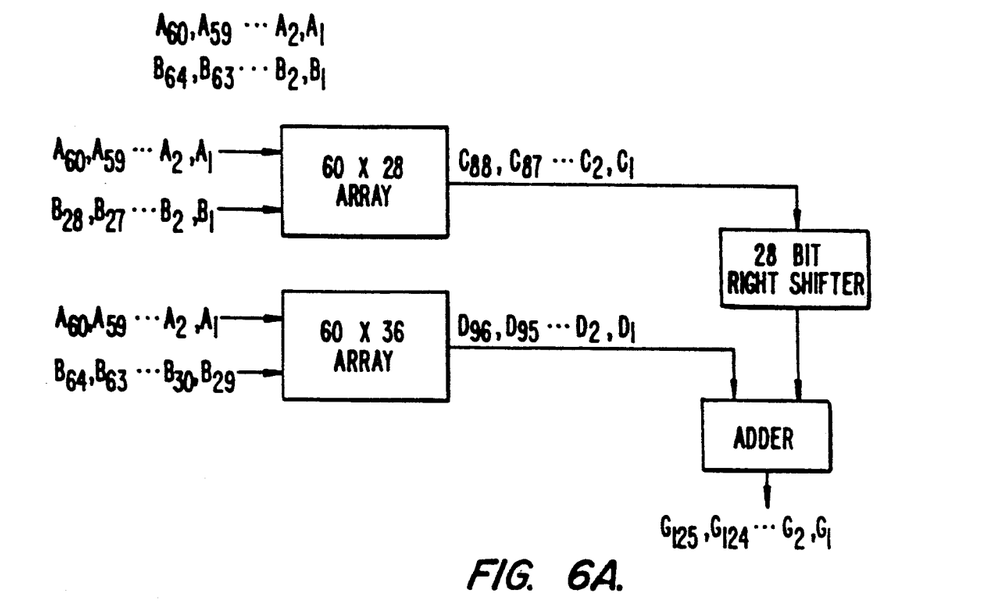
FIGS. 6a and 6b are a block diagram and a mathematical representation of the use of two sub-array multipliers to compute the partial products of a larger multiplication.
Figure 6B:
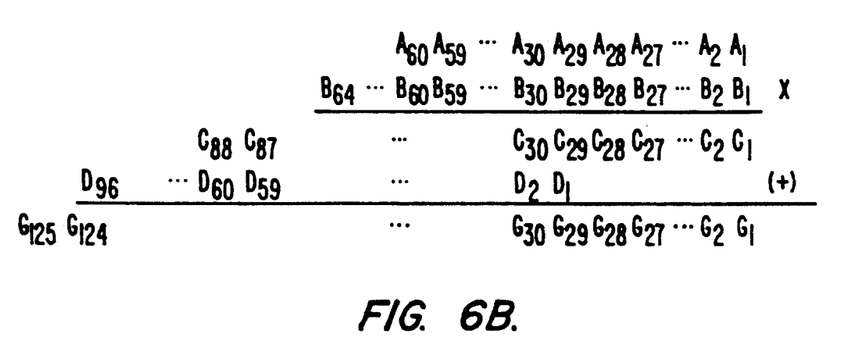

The manner of splitting the array is fairly straightforward; each sub-array 36 and 38 is designed as a normal stand-alone multiplier array. For split-array operations each sub-array is therefore provided its operands, and delivers its result, in a standard manner. In order to combine the sub-arrays into a larger unified array, logic is provided to do the following: One of the two operands is provided in whole to each sub-array. The other operand is split into fragments, one for each sub-array. In this particular embodiment the fragmentation and providing of operands is done by the muxes 41, 51 and Booth recoder 50. The values that these sub-arrays 36 and 38 compute are used as partial products; they are shifted according to the location that the least significant digit of their fragment operand had within the pre-split whole operand. FIGS. 6a and 6b illustrate this. A is a 60 bit operand to be multiplied by B, a 64 bit operand, using a $60 \times 28$ multiplier array and a $60 \times 36$ multiplier array. A is multiplied by the least significant 28 bits of B in the $60 \times 28$ array to produce an 88 bit result C. At the same time, A is multiplied by the most significant 36 bits of B in the $60 \times 36$ array to produce a 96 bit result D. D is then logically left-shifted (the actual hardware does this with a right shift of C to make the layout easier) 28 bits to produce 124 bit F, the leftmost 96 bits of which are the 96 bits of D, and the rightmost 28 bits of which are zeros ($E_{28} \ldots E_1$). C and F are then added together to produce the result G. FIG. 6b illustrates the fact that C and D are partial products, and also makes apparent that D could be provided to the inputs of the adder in a left shifted manner, or C could be provided to the inputs of the adder in a right shifted manner, without needing an actual separate shifter.

In this particular embodiment, multiplexers 42 and 43 do the shifting of the product of array 38 by applying it to the inputs 44, 45 of array 36.

Booth Recoding

The process of multiplication can be thought of as having two main steps, the first being the generation of partial products, and the second being the reduction of these partial products to the final product. To add the first two partial products, one adder is needed, and generally, for each extra partial product an extra adder is needed. The simplest form of multiplication operates bit by bit of the multiplicator, and produces one partial product for each bit in the multiplicator.

Figure 7:
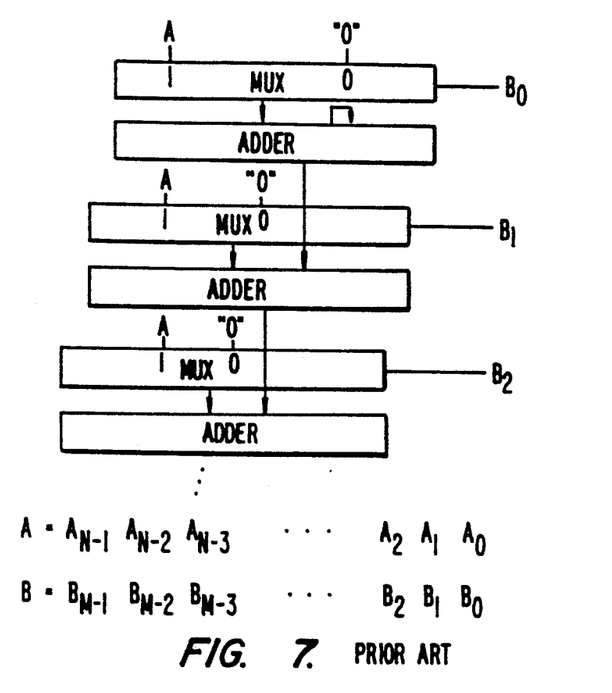
FIG. 7 illustrate a prior art NxM multiplier composed of M pairs of muxes and adders.
Figure 8A:
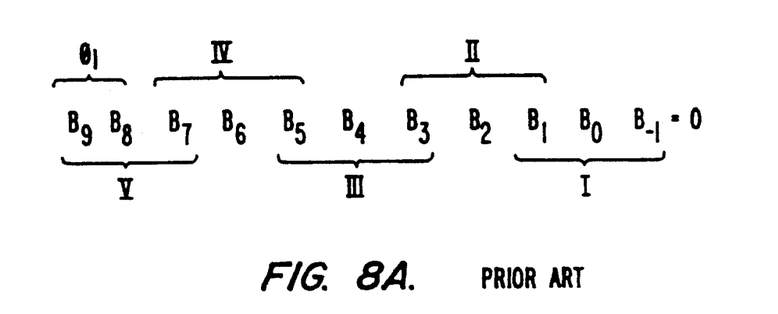
FIG. 8a shows how an eight bit unsigned number is padded with zeroes and grouped for Booth recoding.
Figure 8B:
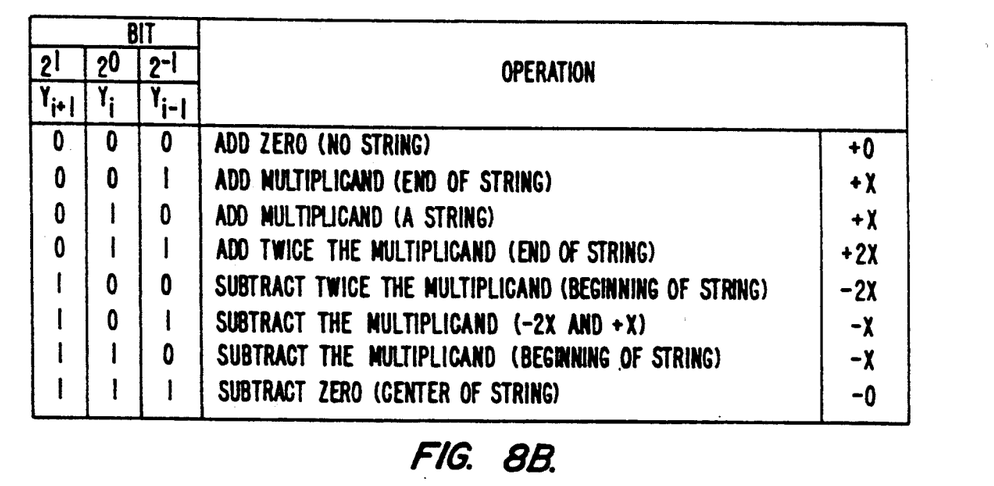
FIG. 8b shows how three bit groups are encoded through standard Booth recoding.
Figure 8C:
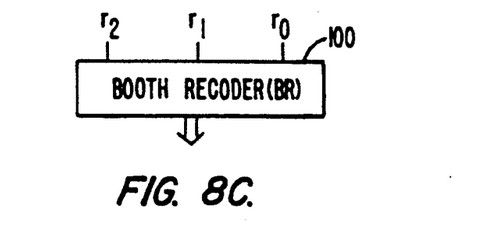
FIG. 8c shows a block diagram representing a Booth Recoder.
Figure 8D:
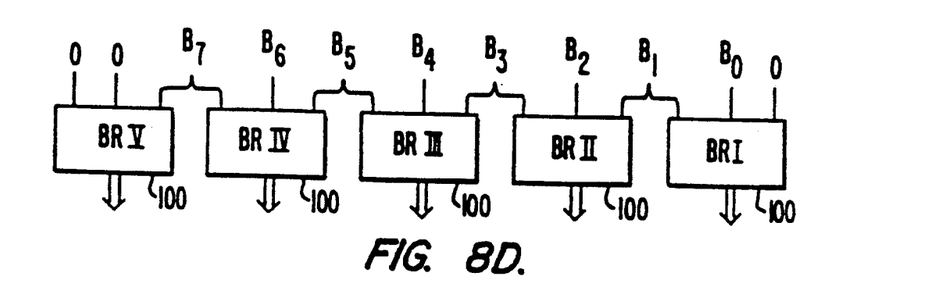
FIG. 8d shows five Booth Recoders of FIG. 8c arranged so as to compute Booth Recoding information for the eight bit unsigned number B.
Figure 9:
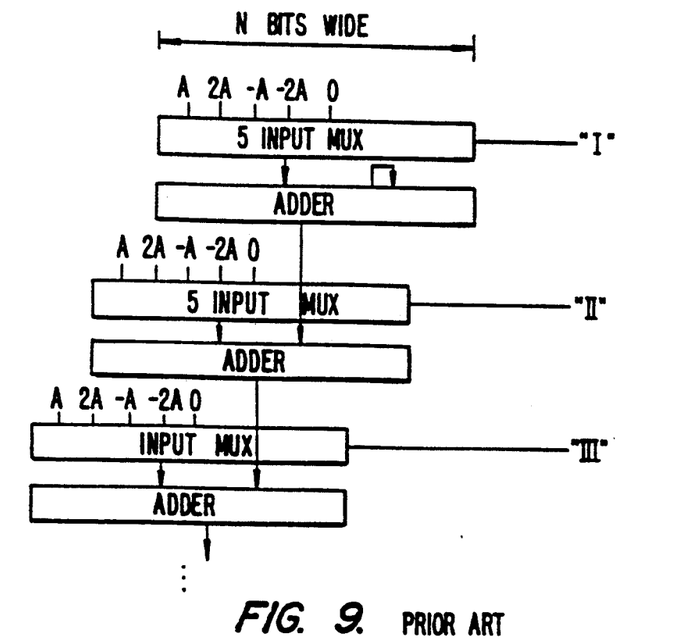
FIG. 9 shows how a multiplier can be constructed from pairs of five input muxes and adders, controlled by Booth recoding information.
Figure 10:
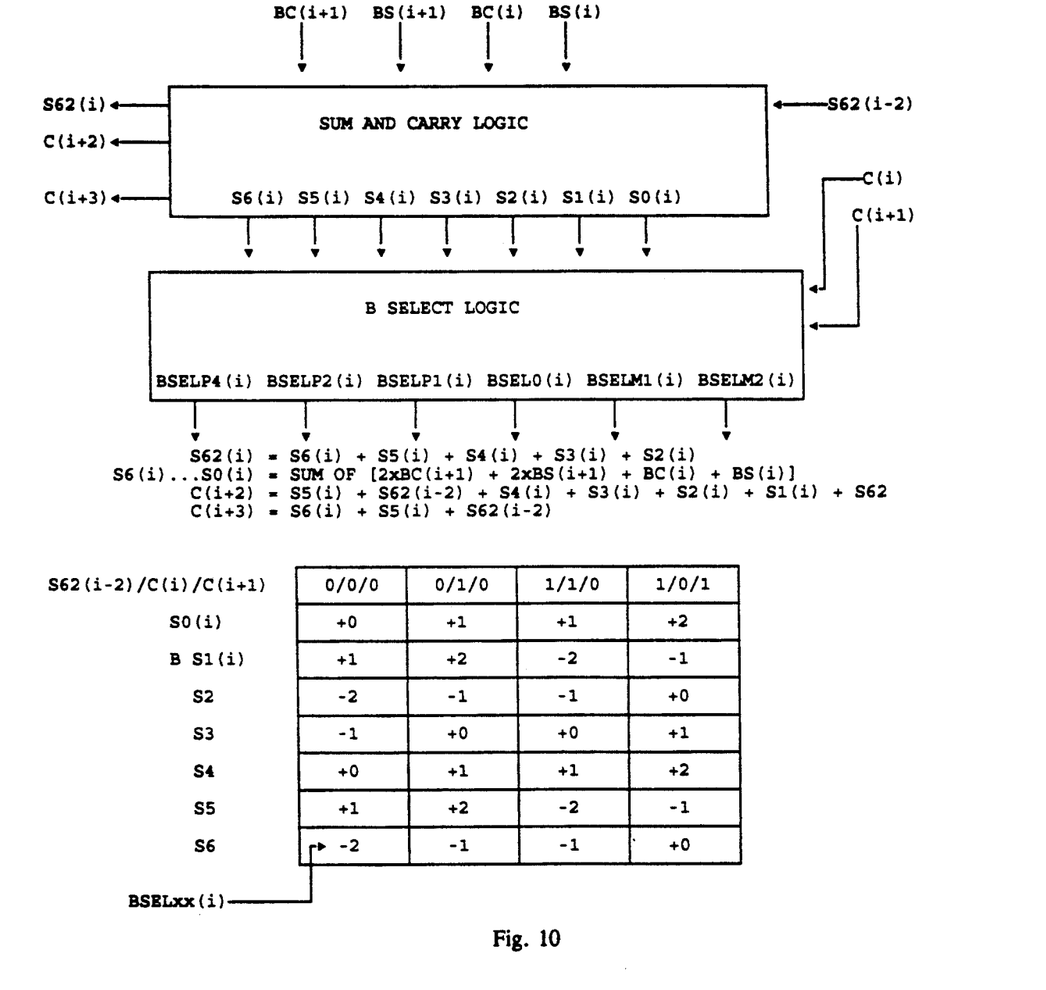
FIG. 10 shows a logic table for carry save Booth recoding.

An n by m bit multiplier along these lines generates m partial products to be added. A simple representation is as in FIG. 7. To build this multiplier a stack of m adders sums up the product. Each partial product is either A or 0, determined by the individual bits of B. This multiplier is simple but costly in size, and m additions are necessary to compute the product. It is possible to reduce the number of partial products to be added, however, by using Booth recoding. Booth recoding lets the multiplication process skip through contiguous strings of 1s and contiguous strings of 0s in the multiplicator; for an n bit multiplicator no more than n/2 partial products are created. Modified Booth recoding, more commonly used, always generates (n/2)+1 partial products and lends itself to parallel hardware implementation. The modified recoding method encodes overlapping 3-bit groups based on whether they start, continue, or end a string of 1s. Each 3-bit group has two bits of primary concern, plus an overlapping bit from the right hand side. FIG. 8a shows how an eight bit unsigned number, padded with one zero to the right and two zeros on the left, is grouped. FIG. 8b shows how a three bit group is encoded through standard Booth recoding. FIG. 8c shows a block diagram of Booth recoding logic which accepts three inputs, $r_0$, $r_1$, and $r_2$. These correspond to bits $Y_{i-1}$, $Y_i$, and $Y_{i+1}$, of FIG. 8b, respectively. So, for an eight bit number, five partial products are produced, and four adders are needed. FIG. 8d shows how five Booth recoders of FIG. 8c can be used to compute the Booth recoding information for the eight bit unsigned number of FIG. 8a. FIG. 9 illustrates the summing of partial products for A times B, where B has m bits. Note that only m/2 adders are needed.

A critical feature of standard Booth recoding is that it deals solely with numbers in binary format; this is a drawback in operations which require a series of multiplies, the result of one multiply being used as an operand in the next multiply operation. When the partial products from one multiply operation are first added, the result is initially in a redundant format, such as carry-save. Before this result may be undergo standard Booth recoding it must be processed by a CP adder to put it in binary format—consuming valuable time. A CP adder needs to propagate a carry from the rightmost position to the leftmost, resulting in n delays for an n bit number to be put into binary format. The CP adder of the present invention has to CP round over 100 bit numbers, meaning over 100 propagation delays. One aspect of the present invention which significantly speeds up series-multiplies is an adapted form of Booth recoding which works with numbers in redundant format.

Figure 11:
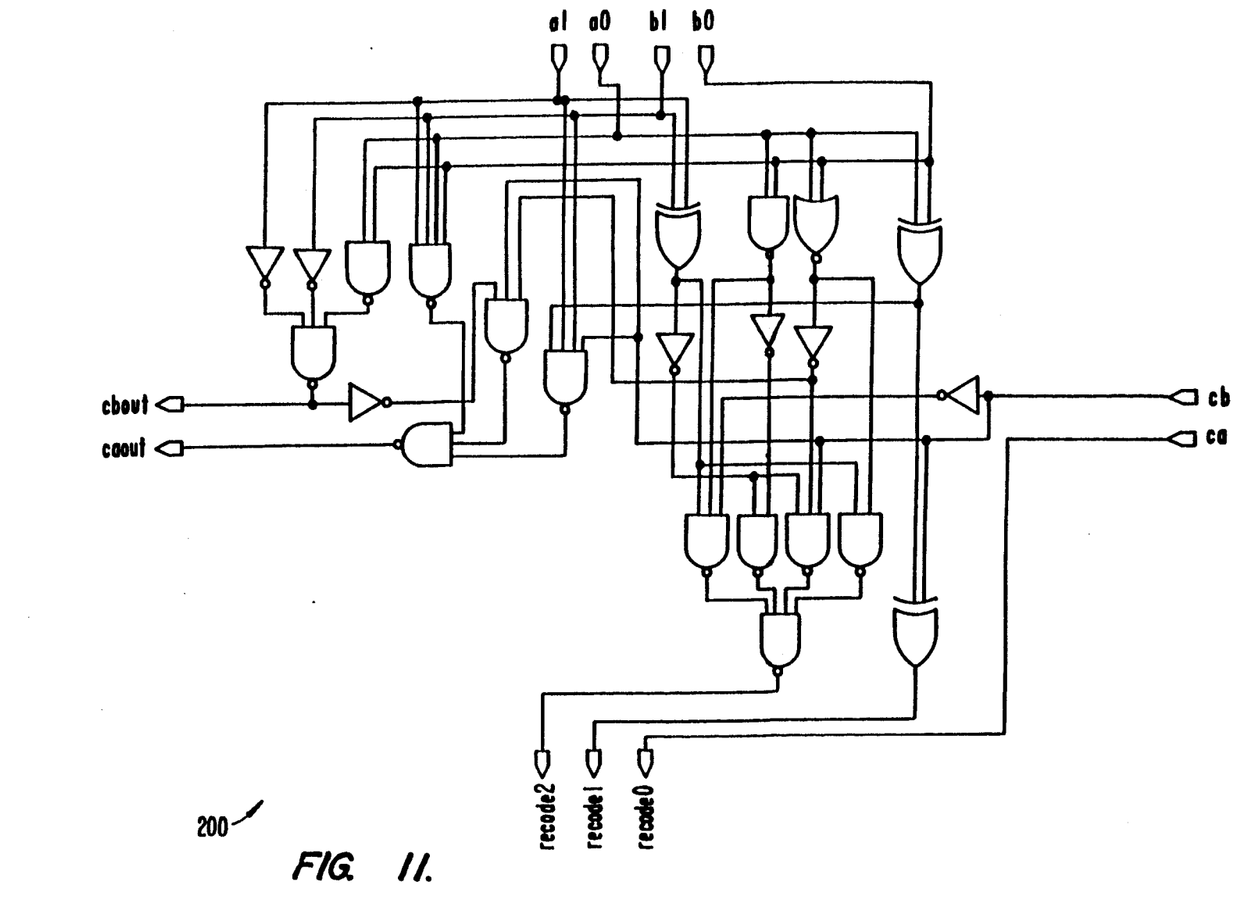
FIG. 11 shows a block diagram for a carry save recoder.
Figure 12:
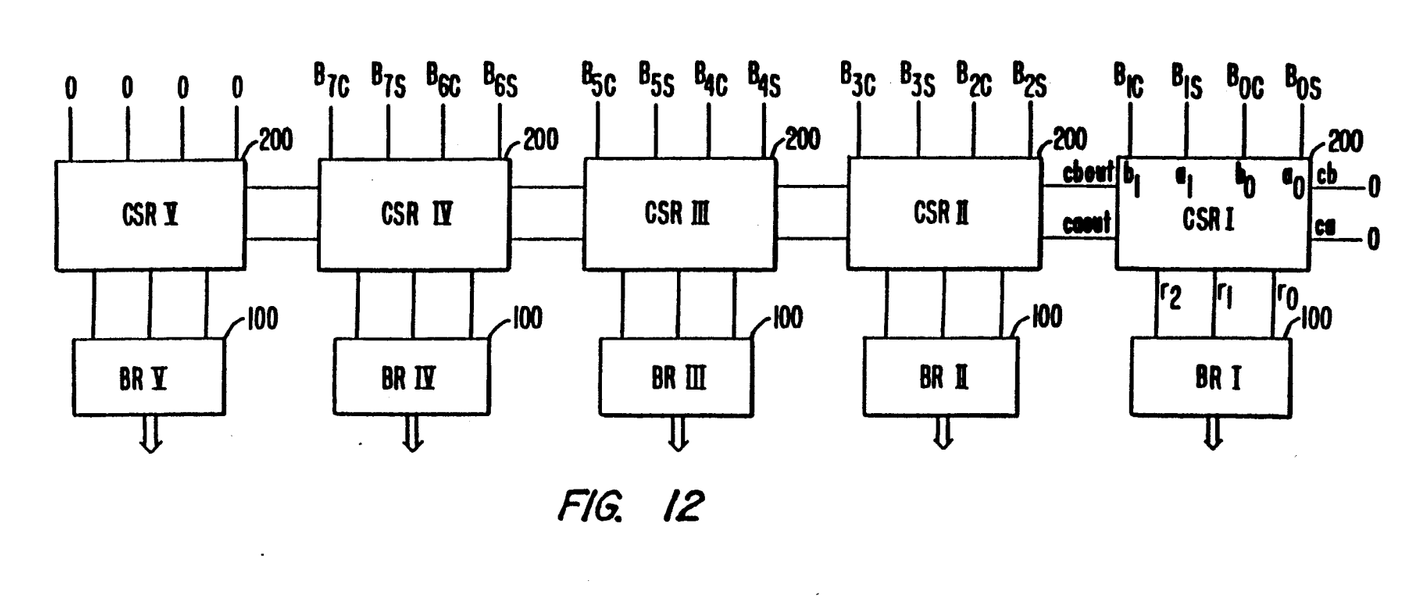
FIG. 12 shows a block diagram in which carry save recoders and booth recoders are arranged so as to compute Booth Recoding information for the eight carry-save pair unsigned number B.

This aspect of the present invention accepts numbers in carry save format and processes them to produce inputs to a group of Booth recoders as in FIG. 8c. The Booth recoders are organized in the same manner as in FIG. 8d, except that the digits, which are in carry save form rather than binary form, are processed by an intermediate layer of logic. This layer of logic consists of a number of identical units, the logic components for one such carry save recode unit is illustrated in FIG. 11, and indicated generally by reference numeral 200. The layer of Carry Save Recoding (CSR) logic does not simply determine the corresponding binary form of the carry save digits, because that would still take n delays for n pairs of carry save digits. Rather, the CSR units accept as inputs the two pairs of carry save bits of primary consideration, and two inputs Ca and Cb from the CSR unit to the right (the next less significant group). Each CSR unit outputs $r_0$, $r_1$, and $r_2$, the information needed by the Booth recoding logic, and also the two bits Caout and Cbout needed by the next CSR unit. The logic is designed such that Cbout is completely independent of Ca and Cb. Caout is affected by Cb, but Cb was determined entirely by the preceding CSR unit, without reference to CSR units earlier (dealing with less significant bits) than that. Also note that Ca gets routed directly to $r_0$, and that is the only use made of it. The CSR unit therefore does not have to wait for a valid Ca before computing its Cbout. Therefore, each CSR unit need wait only for inputs which originate in the unit next to it. No matter how many bits are involved, no matter how many CSR units are chained together, there is only one propagation delay total before each CSR unit has all the necessary inputs to compute the information needed by the Booth recoders. The invention depends upon the fact that the $r_0$ and $r_1$ values have the same effect on the Booth recode logic. The basic idea is that two carries are generated (one of which propagates one CSR unit and the other of which propagates two CSR units). Without waiting for the Cb carry from the preceding unit, a CSR unit generates a Cbout carry in all instances when it might be necessary and in some instances when it might not be necessary. When the valid Cb input arrives, the unit adjusts Caout, so that if the original Cbout carry was unjustified, the Caout (which becomes the $r_0$ output in the next CSR) will cancel out the effect of the Cbout on the $r_1$ output of the next CSR. FIG. 12 illustrates how carry save recoders and Booth recoders are combined to provide the Booth recoding information for a number consisting of 8 pairs of carry-save bits. The carry save recoders can also process normal binary numbers by setting the carry bits to zero.

IEEE Exact Rounding

The preferred embodiment incorporates another aspect of the present invention, directed to providing IEEE exact rounding. By this we mean rounding which meets the requirements set forth in ANSI/IEEE Standard 754-1985. The IEEE standard sets forth two formats for floating point numbers—single precision and double precision. The floating point numbers have an exponent portion e and a fraction portion f, and their magnitude can be represented as $f \times 2^e$, where f is 1.$f_1 f_2 f_3 \ldots f_n$, where n is the number of bits in the fraction portion. Single precision numbers have 23 bits in the fraction portion and double precision numbers have 52 bits in the fraction portion.

The IEEE standard generally describes rounding as taking a number regarded as infinitely precise and, if necessary, modifying it to fit in the destination's format while signalling then that the result is inexact. The majority of mathematical operations are required to be performed as if an intermediate result is first produced with infinite precision and unbounded range, and which is then rounded according to one of a set of rounding modes.

The first rounding mode is called Round-to-Nearest. Under this mode the representable value nearest to the infinitely precise result shall be delivered. If the two nearest representable values are equally near, the one with its least significant bit zero shall be delivered. There are also three user-selectable rounding modes: Round Toward $+\infty$, in which case the result shall be the format's value closest to and no less than the infinitely precise result; Round Toward $-\infty$, in which case the result shall be the format's value closest to and no greater than the infinitely precise result; and Round to Zero, in which case the result shall be the format's value closest to and no greater in magnitude than the infinitely precise result.

The IEEE standard applies in the same way to single precision and to double precision numbers; the reference point is always the least significant bit of the destination format. For single precision numbers this is the 23rd bit, for double precision, the 52nd. For ease of discussion, these two cases will not be differentiated, and the term "lsb" shall mean the least significant bit of the appropriate format. Also, with but minor exceptions the rounding procedure is the same for division as it is for computing square roots. So, all the discussion directed to the quotient will also apply to the square root, except as noted.

It should be noted that for round to nearest, in the worst case the invention needs to determine whether the real quotient falls just below a $\frac{1}{2}$ lsb point, just above it, or directly on it. For the worst case in the other rounding modes the invention needs to determine whether the real quotient falls just below an lsb point, just above it, or directly on it. This is a subset of the $\frac{1}{2}$ lsb points, where the value of the bit at $\frac{1}{2}$ lsb is zero. So, determining the relation of the real quotient to a $\frac{1}{2}$ lsb point will allow all rounding modes to be done.

For whatever calculation is being done, the present invention will compute an initial result which is accurate to several bits less significant than the lsb. At this point the quotient is truncated at the $\frac{1}{4}$ lsb to produce an original calculated quotient $Q_o$. The error will be termed $\epsilon$, and is defined through the equation $Q_r = Q_o - \epsilon$, where $Q_r$ is the real quotient. The data path has been implemented such that $|\epsilon| < \frac{1}{4}$ lsb. It may also be that the magnitude of the error will be less than that, but that statement will definitely hold true, so $-\frac{1}{4}$ lsb $< \epsilon < +\frac{1}{4}$ lsb.

Now, an extra error of $\frac{1}{4}$ lsb is deliberately introduced by adding $\frac{1}{4}$ lsb to $Q_o$ to produce calculated quotient $Q_c$. The range of $\epsilon$ is now $0 < \epsilon < \frac{1}{2}$ lsb. This now assures that the calculated quotient is strictly greater than the real quotient. We now have a better idea of where to "look" to find the real quotient.

For purposes of notation, let N be any number that has a least significant bit of lsb, whether that bit is a zero or a one. We can now make the general statement $N \leq Q_c < N+1$ (where the units are understood to be one lsb and will be so from now on). This can be divided into two cases, (1) $N \leq Q_c < N+\frac{1}{2}$, and (2) $N+\frac{1}{2} \leq Q_c < N+1$. Let us consider these separately.

In all cases, $0 \leq \epsilon < \frac{1}{2}$, so for case (1) $N - \frac{1}{2} < Q_r < N+\frac{1}{2}$. From above, all that needs be determined is $Q_r$'s standpoint relative to $\frac{1}{2}$ lsb points. The only such point within this range is at N. Note the range of $Q_c$ for case (1): the only $\frac{1}{2}$ lsb point contained within it is also at N. So, $Q_c$ is truncated at the $\frac{1}{2}$ lsb point, producing a Q equal to N.

For case (2), where $N+\frac{1}{2} \leq Q_c < N+1$, the range of $Q_r$ is $N < Q_r < N+1$. The only $\frac{1}{2}$ lsb point within this range is $N+\frac{1}{2}$ lsb. Note that again, this is also the only $\frac{1}{2}$ lsb point within the range of $Q_c$, so $Q_c$ is truncated at the $\frac{1}{2}$ lsb point to produce a $Q_t$ equal to $N+\frac{1}{2}$ lsb. For both case (1) and case (2) it is seen that the critical value against which $Q_r$ needs to be compared can be obtained by truncating $Q_c$ at the $\frac{1}{2}$ lsb point to produce a $Q_t$.

Once this critical value is identified, the relation of $Q_r$ to it can be determined by computing a Partial Remainder PR. For division, $PR = Y - X \cdot Q_t$; for square roots, $PR = X - Q_r \cdot Q_t$.

If $PR = 0$, then $Q_r = Q_t$.

If $PR < 0$, then $Q_t - \frac{1}{2} < Q_r < Q_t$.

If $PR > 0$, then $Q_t < Q_r < Q_t + \frac{1}{2}$.

For the multiplication of $X \cdot Q_t$ all of the significant bits of the result are retained for comparison to Y, and Y is padded with zeros in enough lesser significant digits to make it the same size as the $X \cdot Q_t$ product. In all cases, therefore, it can be determined whether $Q_r$ lies just below, exactly on, or just above a $\frac{1}{2}$ lsb point, which provides sufficient information for IEEE exact rounding.

It is to be understood that the above description is intended to be illustrative and not restrictive. Many embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus for multiplying operands, and further for determining a result for a function of x to a specified precision using a polynomial equation to approximate the function, said apparatus comprising:
   a first sub-array multiplier for multiplying an m bit first operand by an n bit second operand to produce a first product, m and n being integers;
   a second sub-array multiplier for multiplying an m bit third operand by a p bit fourth operand to produce a second product, wherein said operands can all be different, p being an integer;
   means for selecting a split array mode and a unified array mode;
   means, coupled to the selecting means and to the sub-arrays, for supplying operands to the sub-arrays, wherein said supplying means,
   a) when the split array mode is selected, supplies independent operands to the sub-arrays, and
   b) when the unified array mode is selected,
      i) supplies a fifth operand having m bits both to the first sub-array as the first operand and to the second sub-array as the third operand, and ii) supplies to the first sub-array as the second operand a least significant group of n bits from a sixth operand having n plus p bits, and iii) supplies to the second array as the fourth operand a most significant group of p bits from the sixth operand;

means, coupled to the sub-arrays, for combining the first product and the second product to produce the sum of a value equal to the first product right-shifted n bits plus the second product;

a memory for holding a plurality of coefficients for the polynomial equation for each of a plurality of values of x;

an input bus for x having a plurality of bit lines, a portion of said bit lines corresponding to the higher order bits of x being coupled to address inputs of said memory;

arithmetic means, coupled to data outputs of said memory and said input bus, and coupled to said means for selecting modes and to said means for supplying operands, for determining an approximation of the function according to a polynomial equation for the function in an interval specified by said portion of the higher order bits of x, using said plurality of coefficients in said polynomial equation.

2. The apparatus of claim 1, wherein the result is a rounded result having no bits less significant than a predetermined least significant bit LSB, said apparatus further comprising:

means for determining a starting result from the approximation, said starting result having bits more significant than LSB and having at least bits ½ LSB and ¼ LSB which are one bit and two bits less significant than LSB, respectively;

means for truncating the starting result at the ¼ LSB to produce an initial number $Q_0$;

means for adding ¼ LSB to $Q_0$ to produce a calculated result $Q_c$;

means for truncating $Q_c$ at the ½ LSB to produce a truncated result $Q_t$;

means for determining a partial remainder using $Q_t$ as a result for partial remainder purposes;

means for determining the rounded result from the starting result, wherein the partial remainder has a status selected from the group of positive, negative, and zero, and wherein the rounded result is determined according to the status of the partial remainder.

3. The apparatus of claim 2, wherein said arithmetic means produces an intermediate result in redundant format and further includes:

Booth recoders with Booth recoder information inputs;

redundant format operand bit inputs coupled to receive the intermediate result;

a first carry input;

a first carry output independent of said first carry input; and means for computing Booth recoder information bits using the redundant format operand bit inputs and the first carry input, said information bits being coupled to the Booth recoder inputs.

* * * * *